US009633435B2

(12) United States Patent
Ma et al.

(10) Patent No.: US 9,633,435 B2
(45) Date of Patent: Apr. 25, 2017

(54) CALIBRATING RGB-D SENSORS TO MEDICAL IMAGE SCANNERS

(71) Applicant: Siemens Healthcare GmbH, Erlangen (DE)

(72) Inventors: Kai Ma, Plainsboro, NJ (US); Yao-jen Chang, Princeton, NJ (US); Vivek Kumar Singh, Monmouth, NJ (US); Thomas O'Donnell, New York, NY (US); Michael Wels, Bamberg (DE); Tobias Betz, Fuerth (DE); Andreas Wimmer, Forchheim (DE); Terrence Chen, Princeton, NJ (US)

( * ) Notice: Subject to any disclaimer, the term of this patent is extended or adjusted under 35 U.S.C. 154(b) by 49 days.

(21) Appl. No.: 14/865,986

(22) Filed: Sep. 25, 2015

(65) Prior Publication Data

US 2017/0091940 A1 Mar. 30, 2017

(51) Int. Cl.

*G06K 9/00* (2006.01)
*G06T 7/00* (2017.01)
*G06T 11/00* (2006.01)

(52) U.S. Cl.

CPC .......... *G06T 7/0018* (2013.01); *G06T 11/005* (2013.01); *G06T 2207/30208* (2013.01)

(58) Field of Classification Search

None

See application file for complete search history.

(56) References Cited

U.S. PATENT DOCUMENTS 8,908,958 B2 * 12/2014 Kimmel ............. G01B 11/2509 348/50
9,119,670 B2 * 9/2015 Yang ...................... A61B 90/30
2005/0018891 A1 * 1/2005 Barfuss .................... A61B 6/12 382/131
2011/0153993 A1 * 6/2011 Gopal ................. G06F 9/30094 712/221
2015/0139532 A1 * 5/2015 Kim ...................... G06T 7/0071 382/154
2015/0350618 A1 * 12/2015 Meier .................. H04N 9/3185 345/7

* cited by examiner

*Primary Examiner* — Nancy Bitar

(57) ABSTRACT

A computer-implemented method for automatically calibrating an RGB-D sensor and an imaging device using a transformation matrix includes using a medical image scanner to acquire a first dataset representative of an apparatus attached to a downward facing surface of a patient table, wherein corners of the apparatus are located at a plurality of corner locations. The plurality of corner locations are identified based on the first dataset and the RGB-D sensor is used to acquire a second dataset representative of a plurality of calibration markers displayed on an upward facing surface of the patient table at the corner locations. A plurality of calibration marker locations are identified based on the second dataset and the transformation matrix is generated by aligning the first dataset and the second dataset using the plurality of corner locations and the plurality of calibration marker locations. Then, a translation is added to the transformation matrix corresponding to a maximum height associated with the apparatus.

15 Claims, 11 Drawing Sheets

1000

| Methods | Expert annotation tools & phantom CT scan (current method) | Using phantom CT scan & RGB-D camera | | Without CT Scan | |
|---|---|---|---|---|---|
| | | Operator Positioned Apparatus | Table Embedded Apparatus | Operator Positioned Apparatus | Gantry Integrated Projector |
| Automation | ○ | ○○ | ○○○ | ○○ | ○○○ |
| Cost | ○○○ | ○○ | ○ | ○○ | ○ |
| Modification to existing system | ○○○ (Not needed) | ○○○ (not needed) | ○○ (table modification) | ○○○ (not needed) | ○ (scanner modification) |
| Complexity of algorithm | ○○○ (manual) | ○○ (corner detection) | ○○ (marker detection) | ○○ (cube surface & intersection detection) | ○○ (projected pattern detection) |

*Fig. 10*

CALIBRATING RGB-D SENSORS TO MEDICAL IMAGE SCANNERS

TECHNOLOGY FIELD

The present invention relates generally to methods, systems, and apparatuses for calibrating RGB-D sensors with medical scanners into a single coordinate system. The disclosed techniques may be applied to, for example, Computed Tomography (CT) scanners, as well as scanners for other imaging modalities.

BACKGROUND

Over the past few years, several devices for non-radiographic and non-invasive patient monitoring have been introduced such as, for example, Microsoft Kinect and Asus Xtion Pro. These devices, referred to herein as "RGB-D sensors." offer a high degree of precision of 3D dense surface data in real time. The data captured from an RGB-D sensor can be utilized for assist medial image acquisition workflow in several ways. For example, using an RGB-D sensor in operating rooms, surgeons can navigate through medical images during procedures. In order to use the information obtained from the RGB-D sensor for medical scanner acquisition related tasks, the two imaging systems should be calibrated into a single coordinate system.

Any calibration approach must not impose any additional requirements on the environment where the medical scanner is placed. For instance, algorithms must not require specific size of the room or height of ceiling. This ensures that the techniques are applicable to both RGB-D sensors mounted on the medical scanners (possibly during assembly at industry) as well as sensors mounted on ceiling or external fixtures. In other words, the calibration should be carried out by technicians for each individual medical scanner during the scanner setup. Therefore, a simple calibration solution that does not require technicians to have knowledge of camera calibration is preferred.

SUMMARY

Embodiments of the present invention address and overcome one or more of the above shortcomings and drawbacks, by providing methods, systems, and apparatuses related to technologies enabling an interactive, inside view of the patient using various image scanner modalities. An RGB-D camera acquires the observed person's surface in 3D space. A detector recognizes salient corresponding landmarks between an RGB-D cue and a scanner modality. The detected landmarks support the automated registration with scanner modalities.

According to some embodiments of the present invention, a computer-implemented method for automatically calibrating an RGB-D sensor and an imaging device using a transformation matrix includes using a medical image scanner (e.g., a CT scanner, a MRI scanner, or a PET scanner) to acquire a first dataset representative of an apparatus attached to a downward facing surface of a patient table, wherein corners of the apparatus are located at a plurality of corner locations. The corner locations are identified based on the first dataset and the RGB-D sensor is used to acquire a second dataset representative of a plurality of calibration markers displayed on an upward facing surface of the patient table at the corner locations. In some embodiments, each calibration marker is a distinct color and may comprise a dot pattern. Calibration marker locations are identified based on the second dataset and the transformation matrix is generated by aligning the first dataset and the second dataset using the corner locations and the calibration marker locations. Then, a translation is added to the transformation matrix corresponding to a maximum height associated with the apparatus.

Various refinements, additions, or other modifications may be made to the aforementioned method in different embodiments of the present invention. In some embodiments, the method further includes acquiring an image using the medical image scanner and using the transformation matrix to place the image in a coordinate system associated with the RGB-D sensor. In other embodiments, the method further includes acquiring RGB-D data using the RGB-D sensor and using the transformation matrix to place the RGB-D data in a coordinate system associated with the medical image scanner. In some embodiments, prior to using the RGB-D sensor to acquire the second dataset, the patient table is moved to a lowest and out-most position.

According to other embodiments, a second computer-implemented method for automatically calibrating an RGB-D sensor and an imaging device includes receiving a user request for auto-calibration and, in response to the user request, projecting a predefined RGB pattern on a patient table using a projector associated with a medical image scanner (e.g., a CT scanner, a MRI scanner, or a PET scanner). The RGB-D sensor is used to capture an image of the patient table with the predefined RGB pattern. The predefined RGB pattern is identified in the image and a coordinate transformation is estimated between the projector and the RGB-D sensor using the predefined RGB pattern.

Various refinements, additions, or other modifications may be made to the aforementioned second method in different embodiments of the present invention. For example, in some embodiments, the method further comprises acquiring a new image using the medical image scanner and using the coordinate transformation to place the new image in a coordinate system associated with the RGB-D sensor. In other embodiments, the second method further includes acquiring RGB-D data using the RGB-D sensor and using the coordinate transformation to place the RGB-D data in a coordinate system associated with the medical image scanner.

According to other embodiments, a system for image coordinate system calibration includes a patient table, an apparatus, a plurality of calibration markers, a medical image scanner (e.g., a CT scanner, a MRI scanner, or a PET scanner), an RGB-D sensor, and a computer comprising at least one processor. The patient table comprises an upward facing surface and a downward facing surface. The apparatus is attached to the downward facing surface of the patient table and the corners of the apparatus are located at a plurality of corner locations. Calibration markers are displayed at plurality of calibration marker locations on the upward facing surface of the patient table above the corner locations. In some embodiments, each of the calibration markers is a distinct color and comprises a dot pattern. The medical image scanner included in the system is configured to acquire a first dataset representative of the apparatus and the RGB-D sensor is configured to acquire a second dataset representative of the calibration markers. The computer's processor is configured to identify the corner locations based on the first dataset; identify the calibration marker locations based on the second dataset; generate a transformation matrix by aligning the first dataset and the second dataset using the corner locations and the calibration marker locations; and add a translation to the transformation matrix corresponding to a maximum height associated with the apparatus.

In some embodiments of the aforementioned system, the processor is further configured to use the transformation matrix to place new image data acquired with the medical image scanner into a coordinate system associated with the RGB-D sensor. In other embodiments, the processor is further configured to use the transformation matrix to place new RGB-D data acquired with the RGB-D sensor into a coordinate system associated with the medical image scanner.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 10 provides a table showing a comparison of the techniques described above with reference to FIGS. 2-9.

DETAILED DESCRIPTION OF ILLUSTRATIVE EMBODIMENTS

The following disclosure describes the present invention according to several embodiments directed at methods, systems, and apparatuses related to the automatic and semi-automatic calibration processes that can accurately align an RGB-D sensor to a medical image scanner (e.g., a CT scanner). Once the two imaging systems are calibrated, the information and data can be directly transferred from one system to the other. Moreover, the image scanner can offer high quality volume data as the ground truth data to the RGB-D sensor. For clarity, some embodiments of the subject matter disclosed herein are described with respect to a CT image scanner. However, in light of the present disclosure, those skilled in the art will recognize that the suggested calibration techniques described herein may be used with any image scanner system generally known in the art, including scanners associated with Magnetic Resonance Imaging (MRI) and Positron Emission Tomography (PET) modalities.

Figure 1:
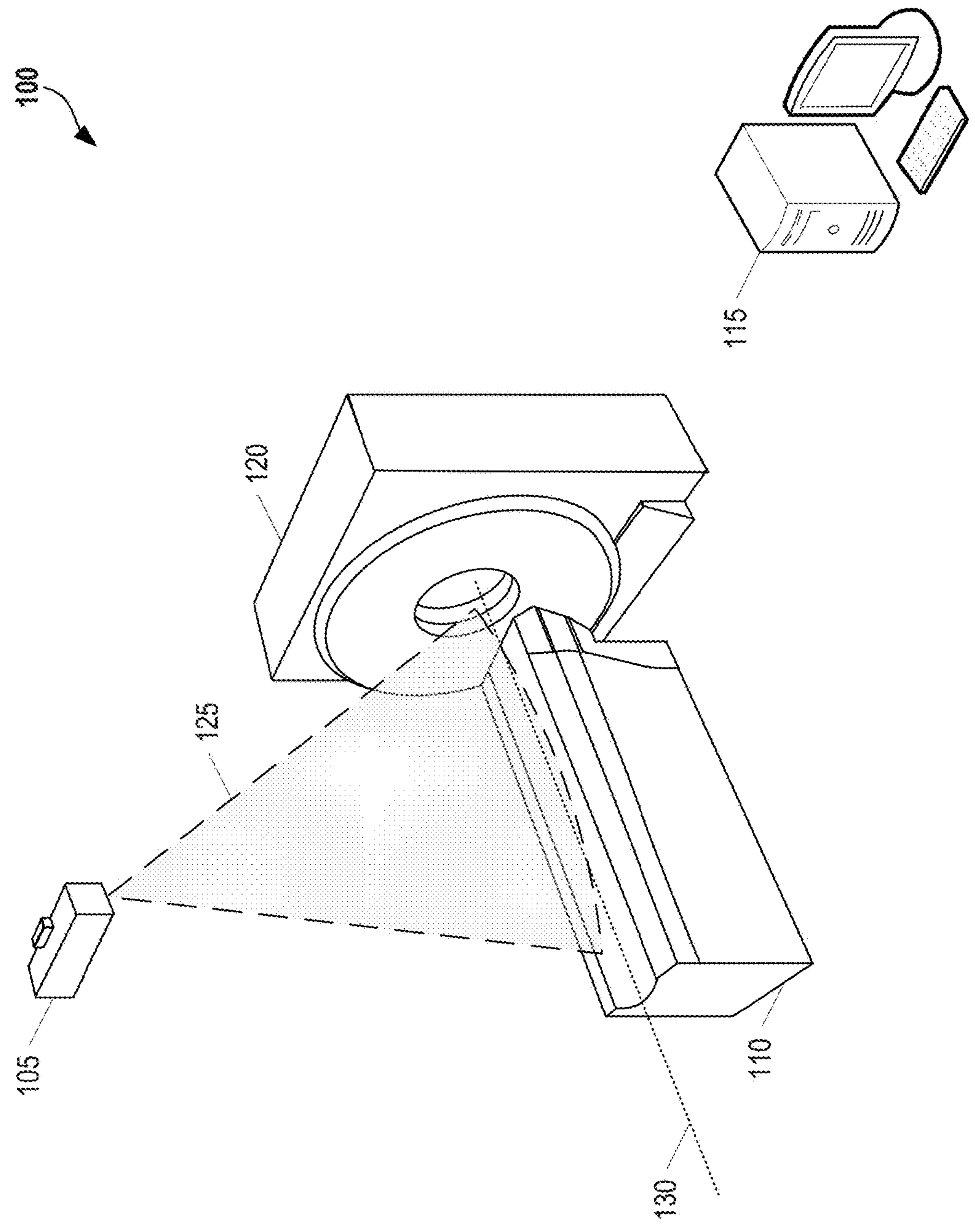
FIG. 1 provides an overview of the visualization system that may be applied in a clinical setting, according to some embodiments.

FIG. 1 provides an overview of the visualization system 100 that may be applied in a clinical setting, according to some embodiments. The visualization system includes an RGB-D Sensor 105 which is configured to combine RGB color information with depth information. Various types of RGB-sensors generally known in the art may be utilized in implementing the visualization techniques described. In the example of FIG. 1, the RGB-D Sensor 105 uses structured light technology. Using such technology, the RGB-D Sensor 105 projects an infrared pattern 125. The reflection of the infrared pattern 125 is captured by an infrared camera in the RGB-D Sensor 105. The captured data is then compared to reference patterns stored in the RGB-D Sensor 105 to estimate pixel depth. This depth data is correlated to an RGB camera in the RGB-D Sensor 105 to yield an RGB image with depth information (i.e., "RGB-D" data). Examples of a commercial RGB-D sensors using structured light technology include the first generation of the Microsoft Kinect and Asus Xtion PRO. It should be noted that structured light is only one example of sensing technology that can be used for implementing the RGB-D Sensor 105. In other embodiments, other RGB-D technologies may be used such as, for example, Time of Flight (ToF) cameras implemented by devices such as the second generation of the Microsoft Kinect.

The RGB-D Sensor 105 is mounted to the ceiling of a room in which an imaging device is installed. In the example of FIG. 1, this imaging device is a Computed Tomography (CT) Imaging Device comprising a patient table 110 and the gantry 120. CT is an imaging technology that uses computer-processed X-ray beams to produce tomographic images of specific areas of a scanned patient. The patient lies on the patient table 110 and is moved during the examination along a system axis 130, also referred to as the z-axis, into the measurement field generated in the gantry 120. Inside the gantry 120, the patient is showered with X-ray beams Each X-ray beam comprises bundles of energy (or "photons") which, depending on the structure of the imaged material, may pass through, be absorbed by, or be redirected (i.e., scattered) by the structure. The degree to which an X-ray beam is reduced by an object during imaging is referred to as attenuation. Based on this attenuation, a 3D image of the patient's internal anatomy is generated.

In order to use the information obtained from the RGB-D sensor 105 for CT acquisition related tasks, the two imaging systems are calibrated into a single coordinate system. In FIG. 1, this calibration process is performed by an operator computer 115. The operator computer 115 receives RGB-D and CT image data from the RGB-D Sensor 105 and the CT imaging device, respectively, over a computer network (not shown in FIG. 1). Once the data has been received, various calibration procedures may be applied. FIGS. 2-9 below describe these calibration procedures in detail, as well as different ways the system shown in FIG. 1 may be configured to perform these procedures.

Figure 2:
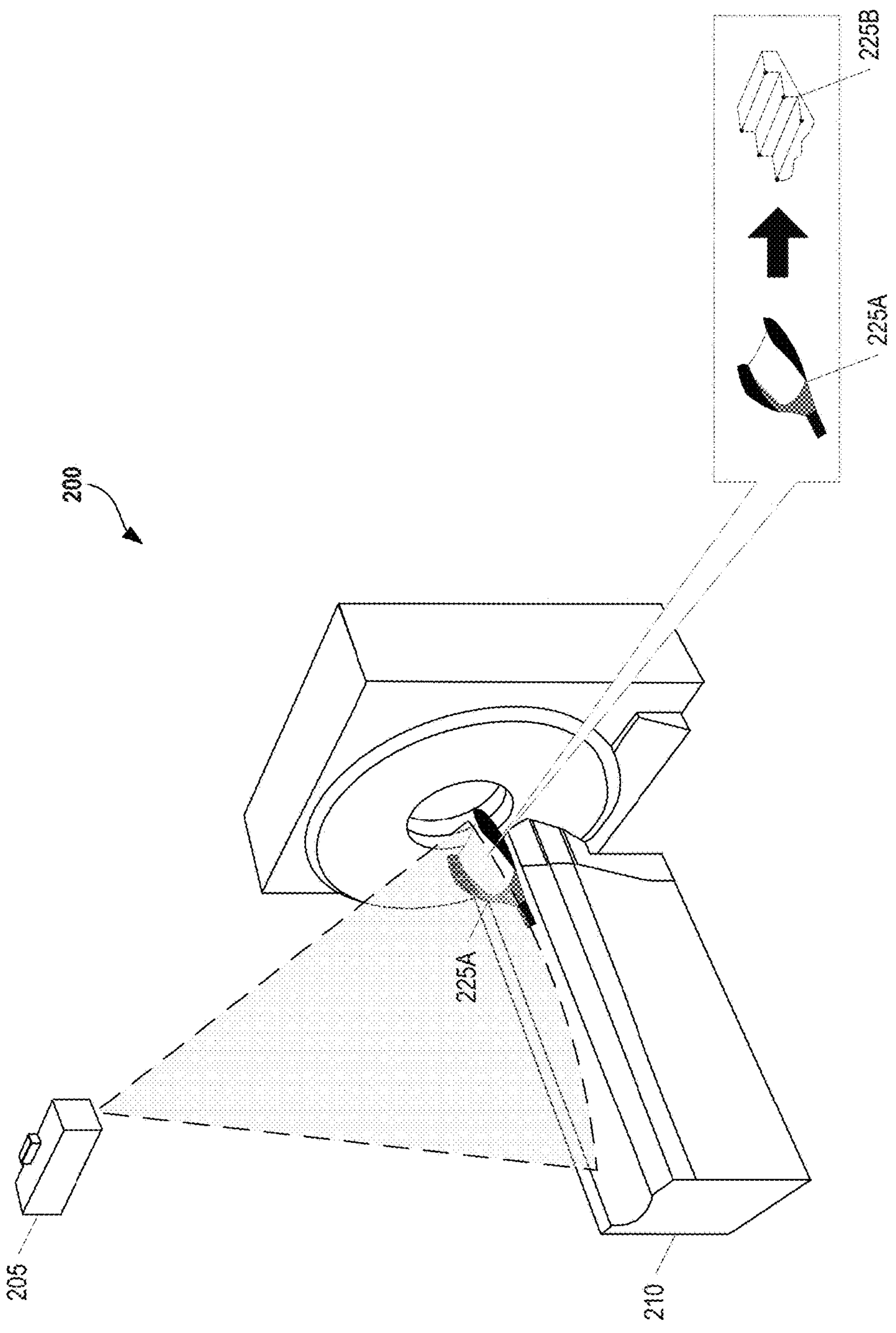
FIG. 2 provides an illustration of a visualization system where auto-calibration is performed using a calibration apparatus.

FIG. 2 provides an illustration of a visualization system 200 where auto-calibration is performed using a calibration apparatus 225B. Based on a CT scan, the surface of the calibration apparatus 225B is retrieved. If this surface is also visible to the depth sensor, the calibration can be preceded by aligning several common key points in the data of the two systems. Based on this assumption, the two systems may be calibrated. The calibration apparatus 225B is placed at a fixed location on the table and visible to the depth sensor. Circle marks may be placed on the patient table 210 where the calibration apparatus 225B can be installed. For example, as shown in FIG. 2, the calibration apparatus 225B may be used to replace a factory designed headrest 225A installed on the patient table 210. It should be noted that the composition of the calibration apparatus may vary according to the imaging modality. For example, if an MRI image scanner is used instead of a CT image scanner, the calibration apparatus would be comprised of magnetic resonant materials.

In the example of FIG. 2, the calibration apparatus 225B has sharp corners and flat surfaces. The corners can be automatically detected by the RGB-D sensor 205 and used to initialize the calibration. The surfaces may have more dense points that can be used to build a more accurate correspondence of the two data sources, and then refine the initial calibration result. It should be noted that various characteristics of the calibration apparatus 225B may be changed in different embodiments of the present invention. For example, the calibration apparatus 225B shown in FIG. 2 is step-shaped. In other embodiments, the dimensions of the shapes may be changed or, alternatively, different shapes may be used.

Figure 3:
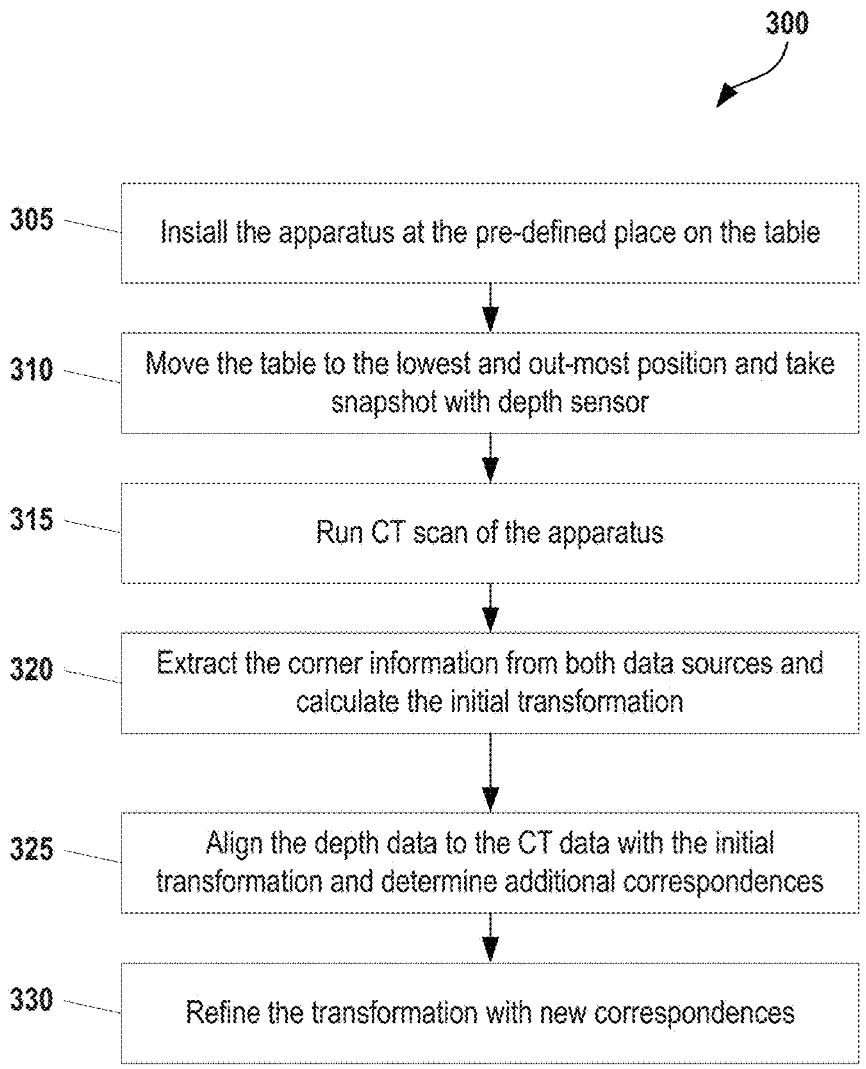
FIG. 3 provides a flow chart illustrating a calibration method where the system shown in FIG. 2 is applied.

FIG. 3 provides a flow chart illustrating a calibration method 300 where the system shown in FIG. 2 is applied. At step 305, the calibration apparatus is installed to a pre-defined place on the table. Next at step 310, the table is moved to the lowest and out-most position and depth data is acquired using the RGB-D sensor. At step 315, the CT imaging device is used to perform a CT scan of the calibration apparatus and acquire corresponding CT image data. Next, at step 320, the corner information is extracted from the depth data and the CT image data. This corner information is used to calculate the initial transformation. At step 325, the depth data is aligned to the CT image data with the initial transformation and additional correspondences are determined with the iterative closest point (ICP)-based surface registration method. Then, at step 330, the transformation is refined with the new correspondences. The accuracy of this calibration method 300 can be affected by several aspects, such as the corner detection result and the depth data noise level. To address the first aspect, in some embodiments, the system 200 illustrated in FIG. 2 has a mode that allows a technician to manually annotate the set of corners. For the second aspect, the accuracy can be improved by iteratively running the last two steps of the calibration procedure.

Figure 4:
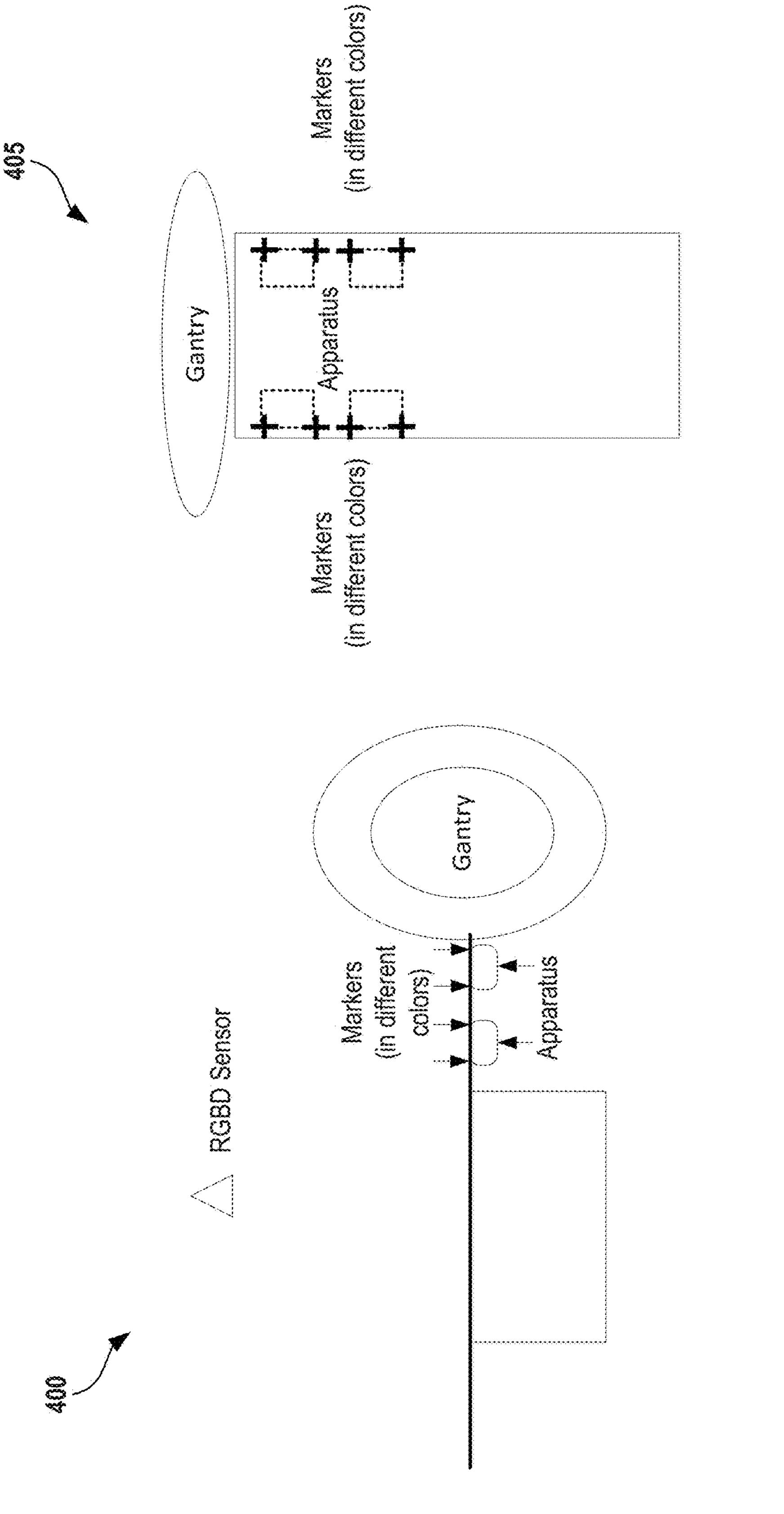
FIG. 4 provides an illustration of an alternative visualization system where auto-calibration is performed with CT and RGB data, according to some embodiments.

FIG. 4 provides an illustration of an alternative visualization system 400 where auto-calibration is performed with CT and RGB data, according to some embodiments. RGB-D sensors generally offer higher resolution RGB images than depth images. Compared to the systems and methods discussed above with respect to FIGS. 2 and 3, an auto calibration method with RGB data can accurately estimate the transformation by using only a few landmarks due to the high precision of both CT and RGB data. However, the landmarks in RGB images (usually special patterns) cannot be directly used for calibration because those patterns are not visible in the CT data. Therefore, in various embodiments, the RGB data is calibrated to the CT with apparatus integrated to the CT table, which is shown in FIG. 4.

More specifically, FIG. 4 shows two views 400 and 405 illustrating how several calibration markers (e.g., dot patterns) with different colors may be attached to the CT table surface. The positions of these markers in the image coordinate system can be automatically detected from the RGB images with standard computer vision technologies generally known in the art. One or more apparatuses may be installed beneath the CT table and the corners of the apparatus(es) are aligned with the markers. Various types of apparatuses may be used within the context of the present invention, including those made of wood, plastic, and composite materials. The defining feature of the apparatus(es) is that it has well-defined corners such that the corners are detectable and identifiable within the CT data. It should be noted that the composition of the apparatus(es) may vary according to the imaging modality. For example, if an MRI image scanner is used instead of a CT image scanner, the apparatus(es) would be comprised of magnetic resonant materials. Using the corner and marker information, the calibration transformation can be calculated by aligning the markets to the corners of the apparatus(es). Additionally, a translation is added equal to the maximum height of the apparatus(es).

Figure 5:
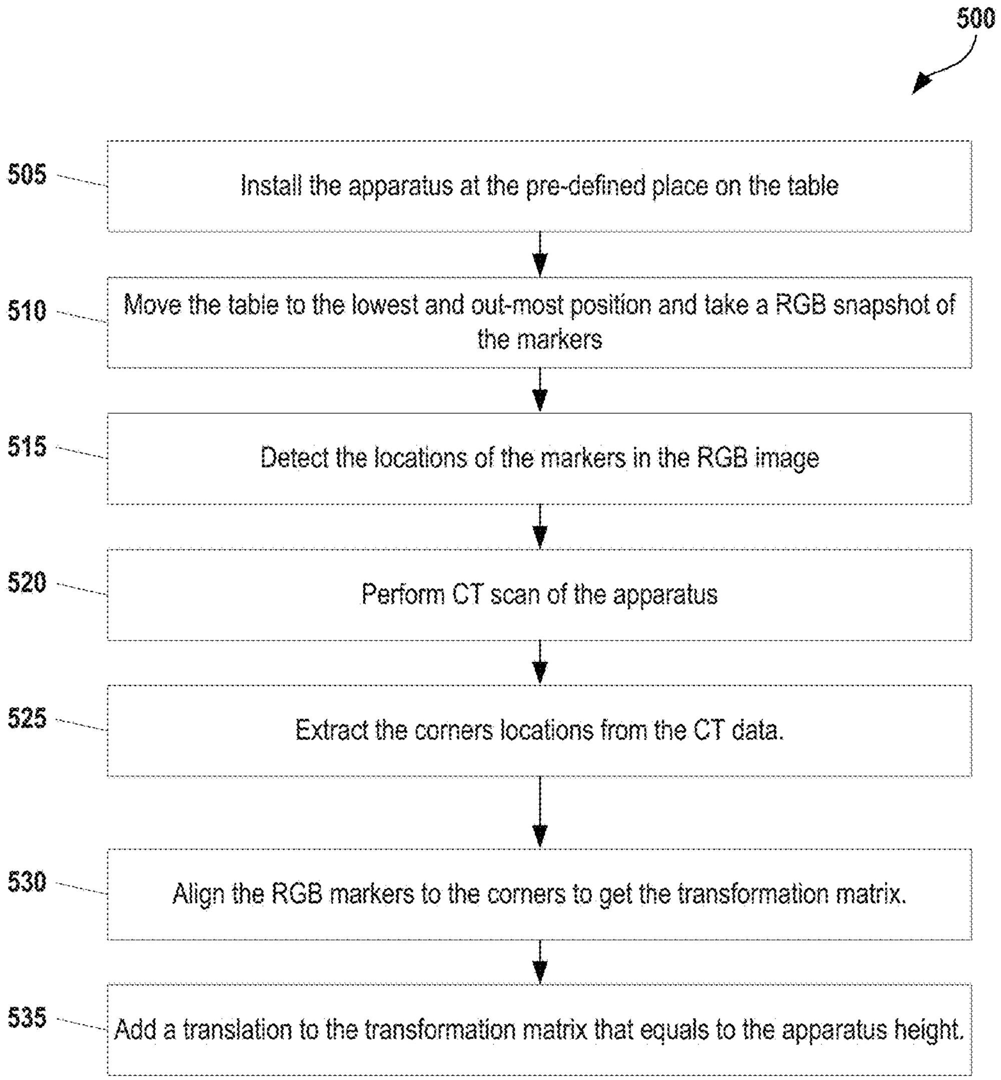
FIG. 5 provides a flow chart illustrating a calibration method where the system illustrated in FIG. 4 is applied.

FIG. 5 provides a flow chart illustrating a calibration method 500 where the system illustrated in FIG. 4 is applied. At step 505, the apparatus is installed in a pre-defined place beneath the CT table as shown in view 400 of FIG. 4. Next, at step 510, the table is moved to the lowest and out-most position and an RGB snapshot of the markers is acquired using the RGB-D sensor. At step 515, the locations of the markers in the RGB image are detected. Next, at step 520, a CT scan is performed of the apparatus and, at step 525, the corners are extracted from the acquired CT data. At step 530, the RGB markers are aligned to the corners to determine the transformation matrix. Then, at step 535, a translation is added to the transformation matrix that equals to the apparatus height.

Figure 6:
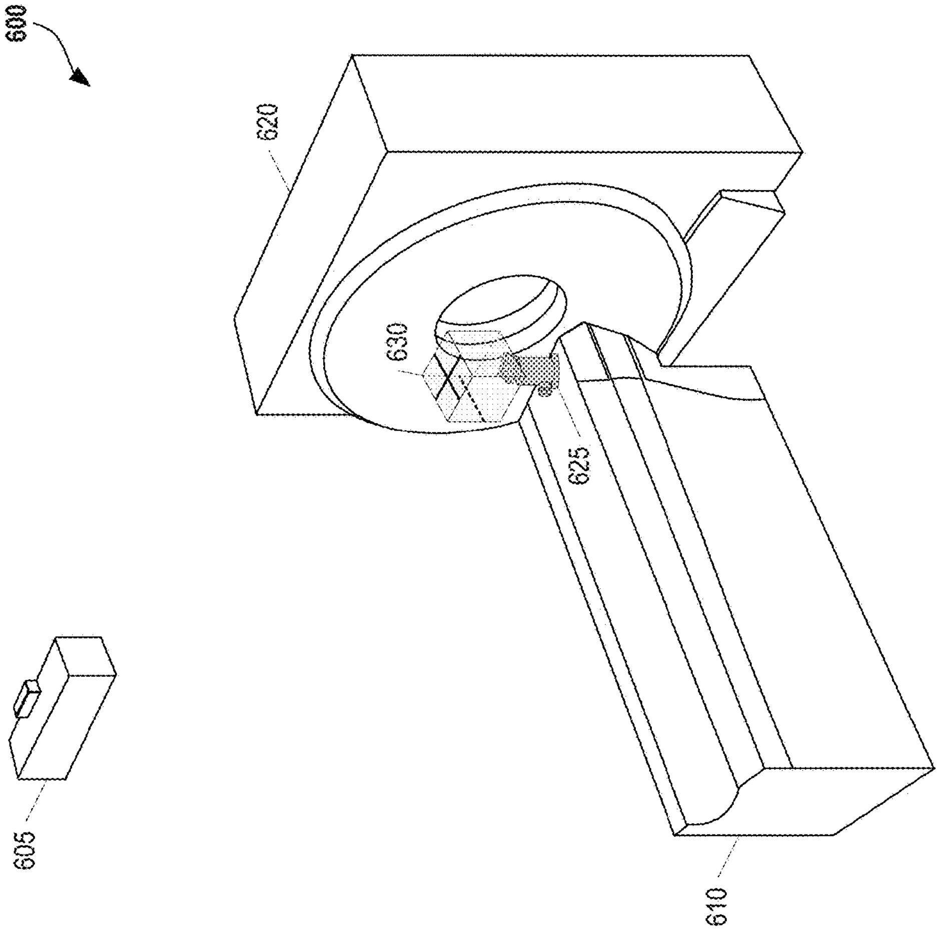
FIG. 6 provides an illustration of another alternative visualization system where auto-calibration is performed with a laser beam, according to some embodiments.

FIG. 6 provides an illustration of another alternative visualization system 600 where auto-calibration is performed with a laser beam, according to some embodiments. The gantry 620 has a laser beam indicator used for aligning the patient prior to performing a CT scan. In this example, an apparatus 625 comprised of a cube 630 on top of a 3-axis tripod platform is used. The cube has guidelines inscribed or otherwise marked on its outer surface (or, alternatively, the cube's inner surface if the cube is transparent or translucent). The apparatus 625 is attached to a flat bottom surface aligned with the surface of the patient table 610. The CT laser alignment lines are then projected onto the cube of the apparatus 625 as shown FIG. 6. These lines are assumed to be aligned with the CT coordinates. The cube is adjusted such that its guidelines align with the laser alignment lines. The RGB-D Sensor 605 is then used to acquire an image of the cube with the projected lines.

Figure 7:
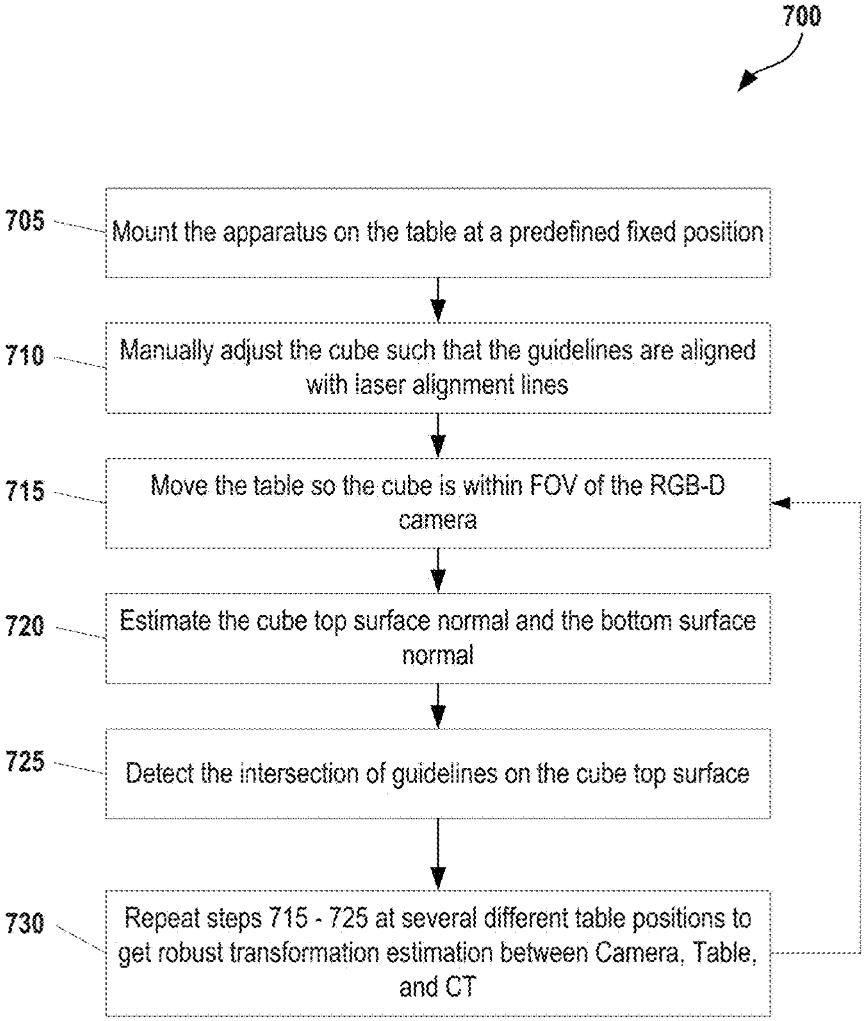
FIG. 7 provides a flow chart illustrating a calibration method where the system shown in FIG. 6 is applied, according to some embodiments.

FIG. 7 provides a flow chart illustrating a calibration method 700 where the system shown in FIG. 6 is applied, according to some embodiments. Starting at step 705, the apparatus is mounted on the table at a predefined fixed position. Next, at step 710, guidelines are projected on the cube using the laser beam indicator provided by the CT machine (see FIG. 5). Also at step 710, the cube is manually adjusted by an operator such that the guidelines are aligned with laser alignment lines. Then, at step 715, the table is moved so the cube is within the field of view (FOV) of the RGB-D sensor. At step 720, the cube top surface normal and the bottom surface normal are estimated and, at step 725, the intersection of guidelines on the cube top surface are detected by the RGB-D sensor. Steps 715-725 may be repeated at several different table positions to provide robust transformation estimation between the RGB-D sensor, patient table, and CT machine.

Figure 8:
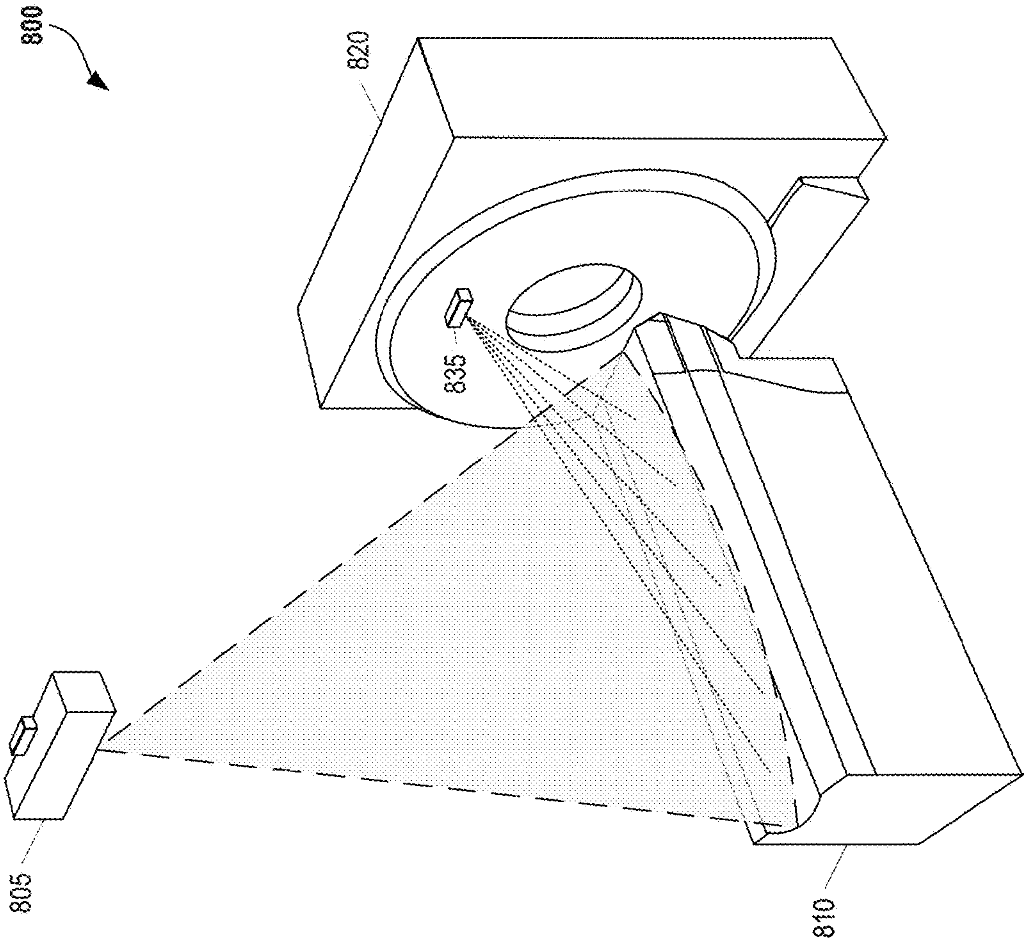
FIG. 8 provides an illustration of another alternative visualization system where auto-calibration is performed with a laser projector, according to some embodiments.

FIG. 8 provides an illustration of another alternative visualization system 800 where auto-calibration is performed with a laser projector, according to some embodiments. No external apparatus is required here. A laser projector 835 attached to the gantry 820 is used to project a pattern on the patient table 810. The exact pattern projected by the laser projector 835 can vary and a combination of different patterns may be used in some embodiments. The RGB-D sensor 805 detects the pattern and performs the calibration procedure.

Figure 9:
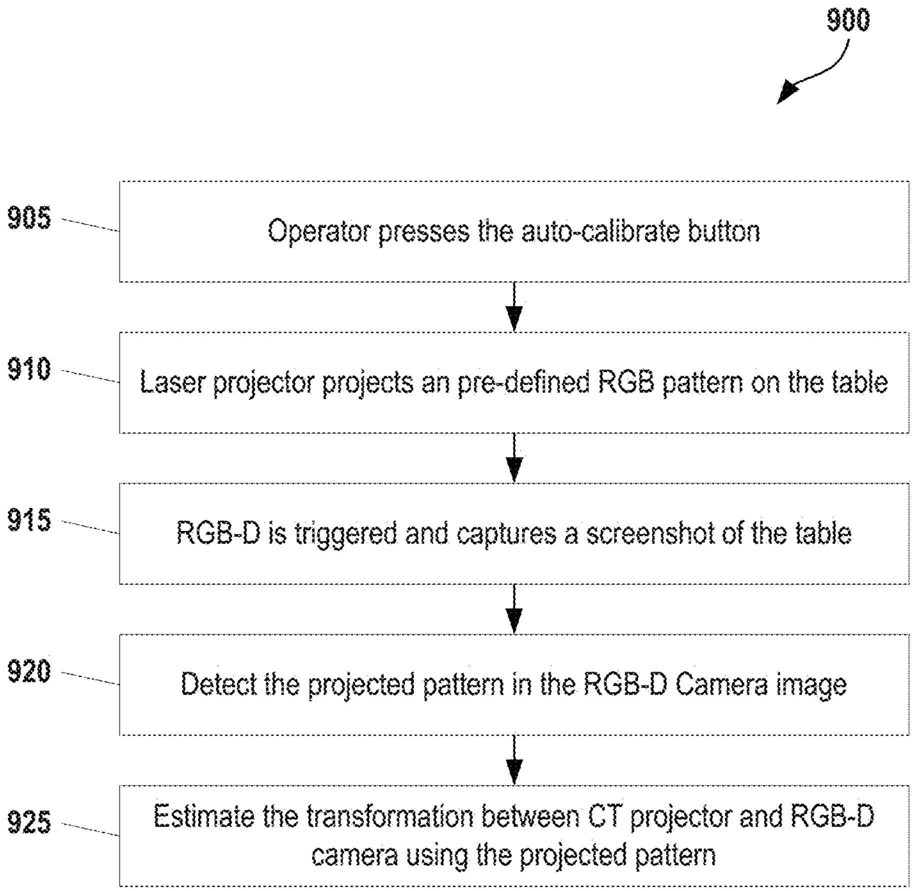
FIG. 9 illustrates a calibration method where the system shown in FIG. 8 is applied, according to some embodiments.

FIG. 9 illustrates a calibration method 900 where the system shown in FIG. 8 is applied, according to some embodiments. The calibration process is started at step 905 when an operator pushes an "auto-calibrate" button (e.g., on the CT device or via an operator interface). In response to the activation of the button, at step 910, the laser projector projects a pre-defined RGB pattern on the table. Next, at step 915, the RGB-D device is triggered and a screenshot of the table is captured. Then, at step 920, the projected pattern is detected in the RGB-D screenshot image and, at step 925, the transformation between the laser projector (CT) and the RGB-D camera is estimated using the projected pattern.

FIG. 10 provides a table 1000 showing a comparison of the techniques described above with reference to FIGS. 2-9. For comparison, the first column provides the corresponding features for the conventional calibration methods of expert annotation tools and a phantom CT scan. In this table 1000, the number of circles in a cell indicates how beneficial a particular technique is compared to the other techniques. For example, the gantry integrated projected is completely automated and is hence marked with 3 circles.

The techniques described herein may be applied in clinical settings to provide enhanced support to surgical operations. For example, in some embodiments, a device equipped with positioning capabilities is used to interactively track the live patient surface using data gathered from the RGB-D sensor and the image scanner. The pose is used to update a display, either on the positioning device, or separately, with the rendering of the scanner modalities to be fused with the live view to achieve a see-through effect. The see-through techniques enable the joint continuous visualization of body hull and internal body structures at various levels of detail.

Figure 11:
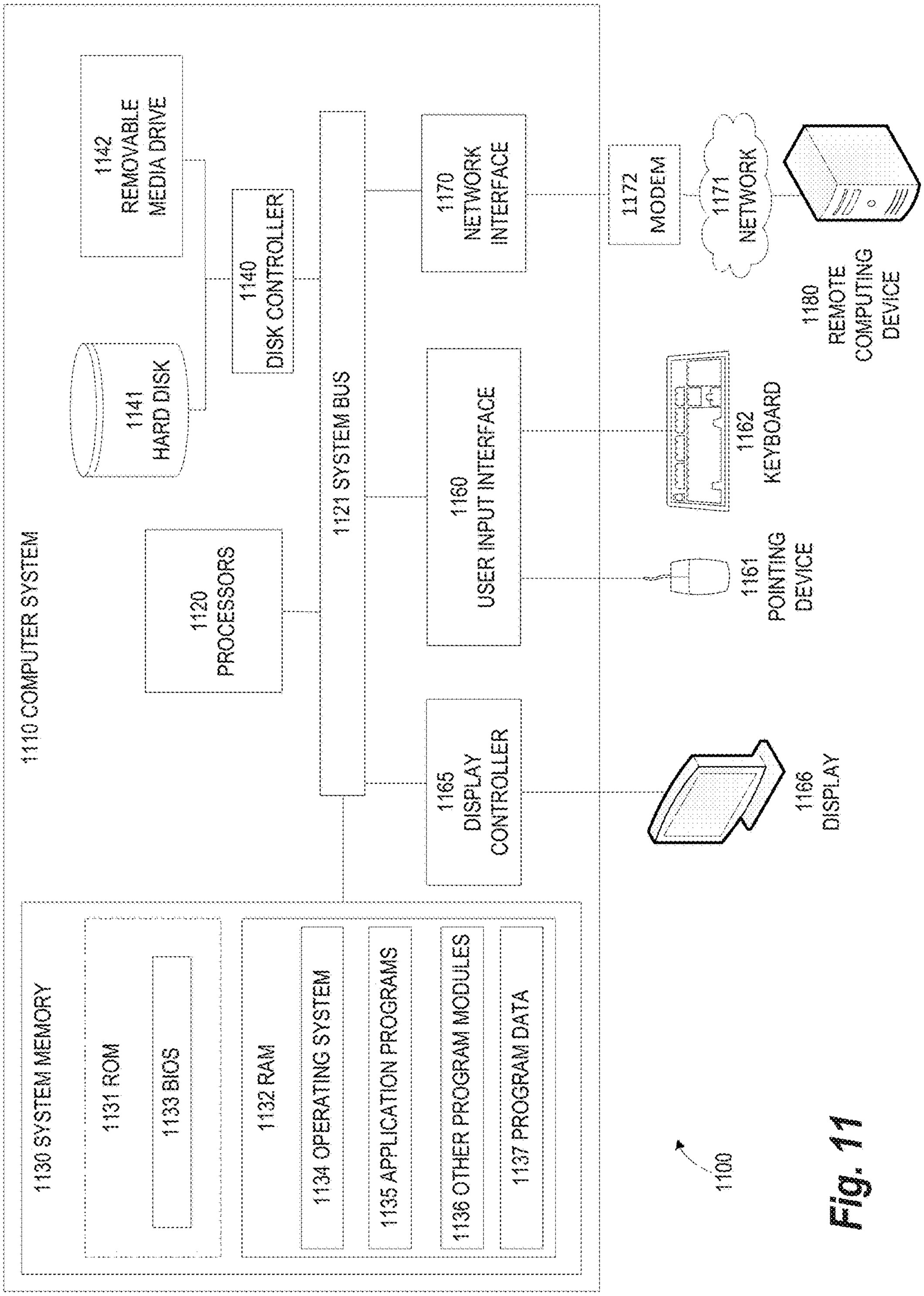
FIG. 11 illustrates an exemplary computing environment within which embodiments of the invention may be implemented.

FIG. 11 illustrates an exemplary computing environment 1100 within which embodiments of the invention may be implemented. For example, this computing environment 1100 may be used to implement the methods 300, 500, 700, 900 illustrated in FIGS. 3, 5, 7, and 9, respectively. The computing environment 1100 may include computer system 1110, which is one example of a computing system upon which embodiments of the invention may be implemented. Computers and computing environments, such as computer system 1110 and computing environment 1100, are known to those of skill in the art and thus are described briefly here.

As shown in FIG. 11, the computer system 1110 may include a communication mechanism such as a bus 1121 or other communication mechanism for communicating information within the computer system 1110. The computer system 1110 further includes one or more processors 1120 coupled with the bus 1121 for processing the information. The processors 1120 may include one or more central processing units (CPUs), graphical processing units (GPUs), or any other processor known in the art.

The computer system 1110 also includes a system memory 1130 coupled to the bus 1121 for storing information and instructions to be executed by processors 1120. The system memory 1130 may include computer readable storage media in the form of volatile and/or nonvolatile memory, such as read only memory (ROM) 1131 and/or random access memory (RAM) 1132. The system memory RAM 1132 may include other dynamic storage device(s) (e.g., dynamic RAM, static RAM, and synchronous DRAM). The system memory ROM 1131 may include other static storage device(s) (e.g., programmable ROM, erasable PROM, and electrically erasable PROM). In addition, the system memory 1130 may be used for storing temporary variables or other intermediate information during the execution of instructions by the processors 1120. A basic input/output system (BIOS) 1133 containing the basic routines that help to transfer information between elements within computer system 1110, such as during start-up, may be stored in ROM 1131. RAM 1132 may contain data and/or program modules that are immediately accessible to and/or presently being operated on by the processors 1120. System memory 1130 may additionally include, for example, operating system 1134, application programs 1135, other program modules 1136 and program data 1137.

The computer system 1110 also includes a disk controller 1140 coupled to the bus 1121 to control one or more storage devices for storing information and instructions, such as a hard disk 1141 and a removable media drive 1142 (e.g., floppy disk drive, compact disc drive, tape drive, and/or solid state drive). The storage devices may be added to the computer system 1110 using an appropriate device interface (e.g., a small computer system interface (SCSI), integrated device electronics (IDE), Universal Serial Bus (USB), or FireWire).

The computer system 1110 may also include a display controller 1165 coupled to the bus 1121 to control a display 1166, such as a cathode ray tube (CRT) or liquid crystal display (LCD), for displaying information to a computer user. The computer system includes an input interface 1160 and one or more input devices, such as a keyboard 1162 and a pointing device 1161, for interacting with a computer user and providing information to the processor 1120. The pointing device 1161, for example, may be a mouse, a trackball, or a pointing stick for communicating direction information and command selections to the processor 1120 and for controlling cursor movement on the display 1166. The display 1166 may provide a touch screen interface which allows input to supplement or replace the communication of direction information and command selections by the pointing device 1161.

The computer system 1110 may perform a portion or all of the processing steps of embodiments of the invention in response to the processors 1120 executing one or more sequences of one or more instructions contained in a memory, such as the system memory 1130. Such instructions may be read into the system memory 1130 from another computer readable medium, such as a hard disk 1141 or a removable media drive 1142. The hard disk 1141 may contain one or more datastores and data files used by embodiments of the present invention. Datastore contents and data files may be encrypted to improve security. The processors 1120 may also be employed in a multi-processing arrangement to execute the one or more sequences of instructions contained in system memory 1130. In alternative embodiments, hard-wired circuitry may be used in place of or in combination with software instructions. Thus, embodiments are not limited to any specific combination of hardware circuitry and software.

As stated above, the computer system 1110 may include at least one computer readable medium or memory for holding instructions programmed according to embodiments of the invention and for containing data structures, tables, records, or other data described herein. The term "computer readable medium" as used herein refers to any medium that participates in providing instructions to the processor 1120 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 1141 or removable media drive 1142. Non-limiting examples of volatile media include dynamic memory, such as system memory 1130. Non-limiting examples of transmission media include coaxial cables, copper wire, and fiber optics, including the wires that make up the bus 1121. Transmission media may also take the form of acoustic or light waves, such as those generated during radio wave and infrared data communications.

The computing environment 1100 may further include the computer system 1110 operating in a networked environment using logical connections to one or more remote computers, such as remote computer 1180. Remote computer 1180 may be a personal computer (laptop or desktop), a mobile device, a server, a router, a network PC, a peer device or other common network node, and typically includes many or all of the elements described above relative to computer system 1110. When used in a networking environment, computer system 1110 may include modem 1172 for establishing communications over a network 1171, such as the Internet. Modem 1172 may be connected to bus 1121 via user network interface 1170, or via another appropriate mechanism.

Network 1171 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 1110 and other computers (e.g., remote computer 1180). The network 1171 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 1171.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A computer-implemented method for automatically calibrating an RGB-D sensor and an imaging device using a transformation matrix, the method comprising:

using a medical image scanner to acquire a first dataset representative of an apparatus attached to a downward facing surface of a patient table, wherein corners of the apparatus are located at a plurality of corner locations;

identifying the plurality of corner locations based on the first dataset;

using the RGB-D sensor to acquire a second dataset representative of a plurality of calibration markers displayed on an upward facing surface of the patient table at the plurality of corner locations;

identifying a plurality of calibration marker locations based on the second dataset;

generating the transformation matrix by aligning the first dataset and the second dataset using the plurality of corner locations and the plurality of calibration marker locations;

adding a translation to the transformation matrix corresponding to a maximum height associated with the apparatus.

2. The method of claim 1, further comprising:

acquiring an image using the medical image scanner;

using the transformation matrix to place the image in a coordinate system associated with the RGB-D sensor.

3. The method of claim 1, further comprising:

acquiring RGB-D data using the RGB-D sensor;

using the transformation matrix to place the RGB-D data in a coordinate system associated with the medical image scanner.

4. The method of claim 1, wherein the medical image scanner is a computed tomography medical image scanner.

5. The method of claim 1, wherein the medical image scanner is a magnetic resonance imaging medical image scanner.

6. The method of claim 1, wherein the medical image scanner is a positron emission tomography medical image scanner.

7. The method of claim 1, wherein each of the plurality of calibration markers is a distinct color.

8. The method of claim 7, wherein each of the plurality of calibration markers comprises a dot pattern.

9. The method of claim 1, further comprising:

prior to using the RGB-D sensor to acquire the second dataset, moving the patient table to a lowest and out-most position.

10. A computer-implemented method for automatically calibrating an RGB-D sensor and an imaging device, the method comprising:

receiving a user request for auto-calibration;

in response to the user request, projecting a predefined RGB pattern on a patient table using a projector associated with a medical image scanner;

using the RGB-D sensor to capture an image of the patient table with the predefined RGB pattern;

identifying the predefined RGB pattern in the image; and estimating a coordinate transformation between the projector and the RGB-D sensor using the predefined RGB pattern.

11. A system for image coordinate system calibration, the system comprising:

a patient table comprising an upward facing surface and a downward facing surface;

an apparatus attached to the downward facing surface of the patient table, wherein corners of the apparatus are located at a plurality of corner locations;

a plurality of calibration markers displayed at plurality of calibration marker locations on the upward facing surface of the patient table above the plurality of corner locations;

a medical image scanner configured to acquire a first dataset representative of the apparatus;

an RGB-D sensor configured to acquire a second dataset representative of the plurality of calibration markers;

a computer comprising at least one processor configured to:

identify the plurality of corner locations based on the first dataset;

identify the plurality of calibration marker locations based on the second dataset;

generate a transformation matrix by aligning the first dataset and the second dataset using the plurality of corner locations and the plurality of calibration marker locations;

add a translation to the transformation matrix corresponding to a maximum height associated with the apparatus.

12. The system of claim 11, wherein the at least one processor is further configured to use the transformation matrix to place new image data acquired with the medical image scanner into a coordinate system associated with the RGB-D sensor.

13. The system of claim 11, wherein the at least one processor is further configured to use the transformation matrix to place new RGB-D data acquired with the RGB-D sensor into a coordinate system associated with the medical image scanner.

14. The system of claim 11, wherein the medical image scanner is a computed tomography medical image scanner.

15. The system of claim 14, wherein each of the plurality of calibration markers is a distinct color and each of the plurality of calibration markers comprises a dot pattern.

* * * * *